(12) United States Patent
Descoteaux

(10) Patent No.: US 6,202,302 B1
(45) Date of Patent: Mar. 20, 2001

(54) METHOD OF FORMING A STATOR ASSEMBLY FOR ROTARY MACHINE

(75) Inventor: Samuel S. Descoteaux, South Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/347,088

(22) Filed: Jul. 2, 1999

(51) Int. Cl.[7] .................................................. B23P 15/00

(52) U.S. Cl. ........................................ 29/889.2; 29/889.1

(58) Field of Search .............................. 29/889.2, 889.21, 29/889.22, 889.1, 889, 434, 428

(56) References Cited

U.S. PATENT DOCUMENTS

| | | | |
|---|---|---|---|
| 5,181,308 | * | 1/1993 | Gray et al. .............................. 29/436 |
| 5,267,397 | * | 12/1993 | Wilcox ................................. 29/889.2 |
| 5,281,089 | * | 1/1994 | Brown et al. ...................... 415/173.1 |

* cited by examiner

*Primary Examiner*—I Cuda Rosenbaum
(74) *Attorney, Agent, or Firm*—Gene D. Fleischhauer

(57) ABSTRACT

A method for forming a stator assembly 28 of a rotary machine 10 which includes masking the stator assembly during a machining operation on a seal member 70 is disclosed. Various detailed steps of the method are disclosed which decrease the cost of the method. In one embodiment of the method, the method includes disposing a shield assembly 98 about the stator assembly 28 to such an extent that individual members of the stator assembly need not be disassembled for cleaning.

19 Claims, 5 Drawing Sheets

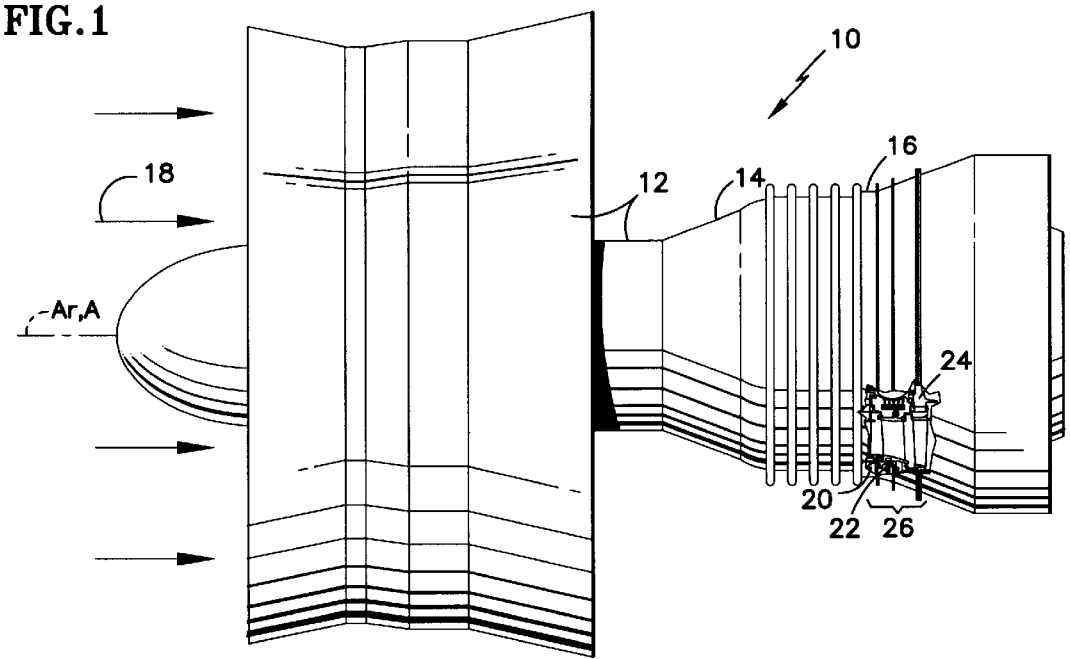
FIG. 1
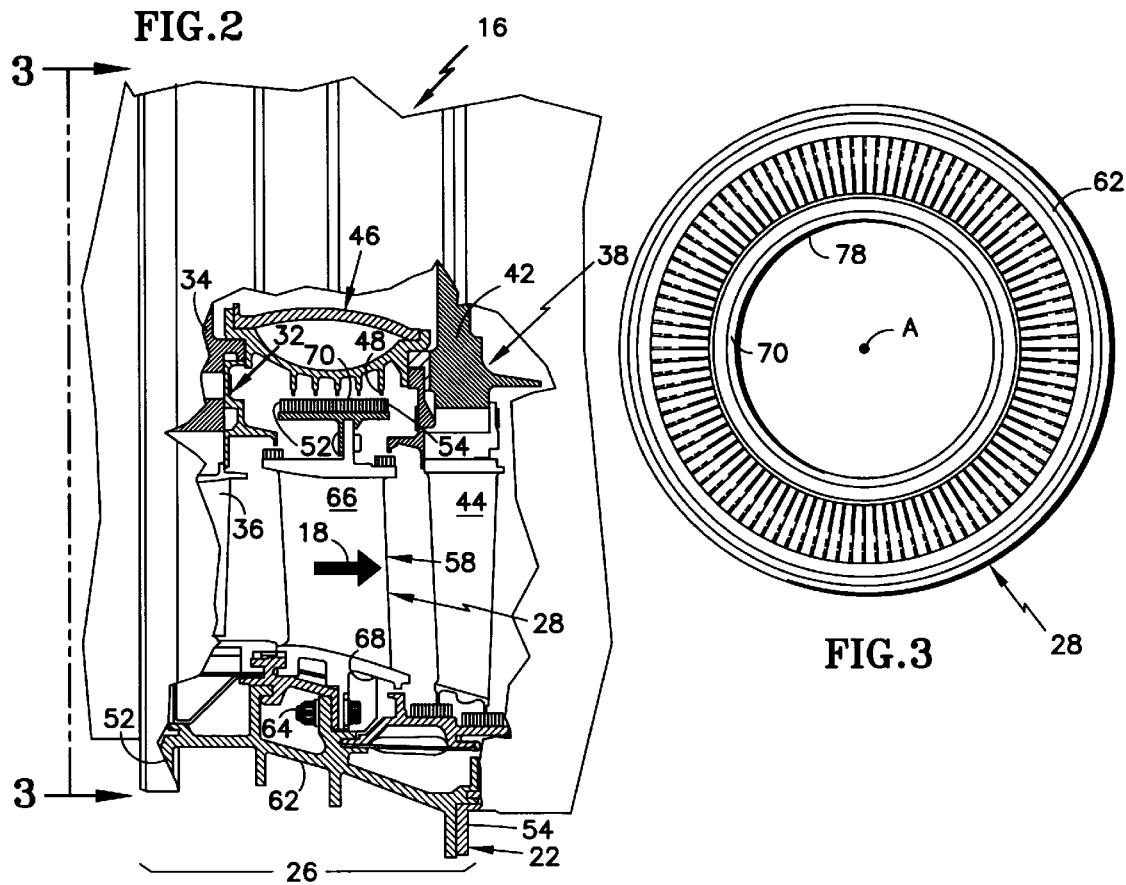
FIG. 2
FIG. 3

METHOD OF FORMING A STATOR ASSEMBLY FOR ROTARY MACHINE

CROSS-REFERENCE TO RELATED APPLICATION

This application relates to U.S. application Ser. No. 09/347,346 entitled "Shield Assembly For Masking A Stator Of A Rotary Machine", by Samuel S. Descoteaux now U.S. Pat. No. 6,109,843.

DESCRIPTION

1. Technical Field

This invention relates to a method for forming a modular section of a rotary machine and more particularly to a method that avoids the need to disassemble and reassemble portions of the stator assembly after a machining operation.

2. Background of the Invention

An axial flow rotary machine, such as a gas turbine engine for an aircraft, has a compression section, a combustion section, and a turbine section. An annular flow path for working medium gases extends axially through the sections of the engine.

The engine adds fuel to the working medium gases and burns the fuel in the combustion section to form hot, pressurized gases. The hot, working medium gases are expanded through the turbine section to extract energy as work from the gases. The energy is transferred to the compression section to raise the pressure of the incoming gases.

The turbine section includes a rotor for receiving this work from the hot working medium gases. The rotor extends axially through the engine. The rotor includes a rotor assembly in the compression section and a rotor assembly in the turbine section. The rotor assemblies includes arrays of rotor blades which extend outwardly across the working medium flow path through which the gases are directed. Rotor blades in the turbine section receive energy from the hot, working medium gases and drive the rotor assembly at high speeds about an axis of rotation. Rotor blades in the compression section transfer energy to the working medium gases to compress the gases as the airfoils are driven about the axis of rotation by the rotor assembly.

The engine includes a stator disposed about the rotor. The stator includes a stator assembly having an outer case. The outer case extends circumferentially about the flow path to bound the working medium flow path. The stator assembly includes seal elements, such as a circumferentially extending seal member which is disposed radially about the rotor assembly. The seal member is formed of arcuate segments which permit the seal member to change diameter in response to operative conditions of the engine. The seal member cooperates with knife edge elements on the rotor assembly to form a seal that blocks the leakage of working medium gases from the flowpath. The seal member is ground to a precise contour such that the seal member can be disposed in close proximity to the rotor assembly.

The stator assembly also has arrays of stator vanes which extend radially inwardly across the working medium flow path. The stator vanes are commonly called vane clusters and have one or more airfoils or stator vanes. The stator vanes are disposed between the arrays of rotor blades in both the compression section and turbine section. The stator vanes guide the working medium gases as the gases are flowed along the flow path. Each has an airfoil which is designed to receive, interact with and discharge the working medium gases as the gases are flowed through the engine.

The airfoils in the turbine section are bathed in hot working medium gases under operative conditions. Certain airfoils in the turbine section, such as stator vanes in the high pressure turbine, are cooled by flowing cooling air through the airfoil to avoid unacceptably high temperatures in the walls of the airfoil. Each stator vane has one or more large openings near the outer case for receiving the cooling air. The stator vane has many small cooling air holes which extend from the interior to the exterior of the airfoil. The cooling air holes discharge cooling air and cool the airfoil by convection and by providing film cooling to regions of the airfoil such as the leading edge or the trailing edge.

The cooling holes which provide this film cooling and convection cooling are very small and are precisely located to avoid over temperaturing critical regions of the stator vane under operative conditions. The holes may be as small as 14 to 20 mils (0.014 to 0.020 inches) in diameter and are easily plugged by any small particles which might inadvertently enter the stator vanes during fabrication and assembly. Plugging the holes will block the flow of cooling air and will cause premature failure of the turbine vane. This results in a loss of engine efficiency and expense in replacing the turbine vane. These particles are removed from the stator vanes prior to final build-up of the case and stator vane assembly. Final build-up of the case and the stator vane assembly might occur by disposing the assembly directly in the engine or in a modular unit of the engine. The modular unit of the engine is later assembled into the remainder of the engine.

Machining operations of various components in the engine during assembly and final build up of the engine create the type of particles which are able to enter the turbine vane. These particles are small enough to plug the cooling air holes if carried into the cooling air holes under operative condition.

An example of one machining process creating small particles is the final grinding of the contour of the seal element mentioned above for the turbine section. This precision machine operation, commonly referred to as a grinding operation, takes place with the vane clusters installed in the case that supports the clusters. The seal is then ground to the final contour required for the seal member. Thereafter, the vane clusters are disassembled from the engine case. The vane clusters are individually cleaned. After cleaning, the vane clusters are inspected for handling damage and are reassembled to the turbine case. During reassembly, feather seal members are disposed in feather seal slots between adjacent segments if required by the design. These feather seals prevent leakage of gases from the flow path through the gap between adjacent segments.

There may be difficulty in inserting the feather seal at final assembly in the appropriate slots because of tolerance variations between the location of the slots and because the surface of the seal element must be reassembled to form a smooth contour. Adjacent segments are preferably kept together during assembly and disassembly to keep the orientation in which they were ground so that surfaces will evenly match upon reinstallation in the turbine case. Again, because of tolerance variations, it is important that adjacent segments remain together during cleaning and reassembly to insure that the as-ground contour of the seal is minimally disturbed by reassembly. Occasionally, the seal segments must be re-ground to replace an individual seal segment that was replaced because of damage during handling. This requires reassembly of the vane clusters and seal segments into the case and regrinding of the entire seal member.

Although the process of disassembly and cleaning may add many hours of labor and increase processing time by several days, the end result is an acceptable assembled case and stator vane assembly. For example, the case and vane assembly will have an acceptable relationship between the surface of adjacent seal segments. Cleaning will have removed any particles of seal material that were generated during the grinding operation and that were carried into the interior of the stator vane by the machining fluid or which entered after seal particles were thrown into the air by the grinding process.

The above art notwithstanding, engineers working under the direction of Applicant's assignee have sought to reduce the processing time for forming the final contour of the seal member without affecting the final result of matched seal segments and the clean interior on the turbine vanes so that the case and vane assembly may then be assembled into a modular unit or directly installed in the engine.

SUMMARY OF INVENTION

This invention is in part predicated on the recognition that masking portions of the case and stator vane assembly during the grinding operation of the seal member may block the movement of seal particles into the interior of some and even all of the stator vanes during the grinding operation and avoid the necessity of disassembling the stator vanes from the case and vane assembly, cleaning of the stator vanes, and reassembly of the stator vanes and their associated seal segments into the case and vane assembly prior to build up of a modular unit of a turbine section of a gas turbine engine.

According to the present invention, a method for forming a modular turbine section of a rotary machine having a stator assembly which includes a case, coolable stator vane clusters, and a circumferentially extending seal member supported by the vane clusters includes the steps of machining the seal member to its finished contour by removing particles of material from the seal member; masking the case and vane assembly during machining to block particles from entering the vanes; and then, without disassembly of every vane cluster from the case during the subsequent build period, cleaning the stator assembly after machining and assembling the modular turbine section that contains the stator assembly.

In accordance with one embodiment of the present invention, the method includes the step of cleaning the stator assembly while in the assembled condition and installing the stator assembly into the rotary machine without disassembling a substantial number of the vane clusters from the case and vane assembly for further cleaning.

In accordance with one embodiment of the present invention, the seal member has a plurality of seal segments which are spaced cicumferentially leaving a gap G therebetween, and the method includes disposing a feather seal member in an associated gap between the adjacent seal segments prior to machining.

In accordance with one detailed embodiment of the present invention, the method includes inspecting the interior of the stator vanes for seal particles and, in the absence of particles on the interior of all vane clusters, assembling the case and vane assembly into the modular turbine section without disassembling any vane clusters from the case and vane assembly.

In accordance with one embodiment of the present invention, the step of machining the seal member includes flowing machining fluid adjacent the seal member which carries away seal particles and the step of masking the case and vane assembly includes disposing a shield between the stream of machining fluid and the open end of the coolable vanes on at least one side of the stator assembly to block the machining fluid from entering the open end of the vane clusters from that side.

In accordance with one detailed embodiment of the present invention, the step of masking the case and vane assembly includes disposing the case and vane assembly on one side of the case and vane assembly such that the other side faces upwardly, and the seal member faces in a substantially horizontal direction with the surface extending vertically, and the step of machining the seal material includes removing particles of seal material from the seal member and spraying fluid against the seal surface to carry particles away from the seal and wherein the step of masking the case and vane assembly includes disposing a shield element which extends from the upper edge or side of the seal member, which faces upwardly and which extends between the opening on the outer end of the vanes and the machining fluid flowing downwardly on the seal member.

In accordance with one detailed embodiment of the present invention, the step of machining the case and vane assembly includes disposing a lower shield element on the other side of the vane cluster that extends from the lower edge or side of the seal member, which faces downwardly and which extends between the outer end of the vanes and the machining fluid flowing downwardly.

A primary feature of the present method is the step of masking the case and vane assembly during machining to block particles from entering the interior of the stator vane cluster. Another feature of the present invention is performing the step of cleaning the stator assembly after machining without disassembling one, many, or all vane clusters from the case. Another feature of the present invention is the step of assembling the modular unit for the turbine section without having disassembled all of the vane clusters after the machining operation. In one embodiment, a primary feature of the present invention, is the step of disposing of a feather seal member in an associated gap between associated seal segments to form a portion of the shield assembly. In one detailed embodiment, another feature is disposing a shield element above the array of stator vanes and below the array of stator vanes to prevent flushing fluid which carries away seal particles from entering the interior of the vane.

A primary advantage of the present invention is the finished contour of the seal member, which results from avoiding disassembly of the vane clusters after machining and re-assembly of the vane clusters after cleaning. Another advantage is the cost of forming the modular section of the engine which results from blocking particles from entering the vane clusters during the machining operation and avoiding the work of assembly and disassembly to clean the stator clusters after machining. Still another advantage is the integrity of the seals between adjacent segments which results from installing the feather seal members once and leaving the feather seal members in place. Still another advantage is the radial orientation of adjacent segments with respect to each other which results from assembling the feather seal members prior to machining, and ensuring that the segments are in a location which adapts the segments to each receive a feather-seal member.

The foregoing features and advantages of the present invention will become more apparent in light of the following detailed description of the best mode for carrying out the invention and accompanying drawings.

The foregoing features and advantages of the present invention will become more apparent in light of the following detailed description of the best mode for carrying out the invention and accompanying drawings.

BRIEF DESCRIPTION OF THE DRAWINGS

FIG. 1 is a side elevation view of an axial flow rotary machine such as a turbofan gas turbine engine, with a portion of the machine broken away.

FIG. 2 is an enlarged side elevation view of the turbine section of the machine shown in FIG. 1 and shows a cross-sectional view of part of a modular unit for the turbine section which includes a stator assembly.

FIG. 3 is a view of the stator assembly at the completion of build-up and corresponds to a view taken along the line 3—3 of FIG. 2 with all portions of the engine broken away except for the stator assembly and shows the relationship of a case of the stator assembly to a seal member of the stator assembly.

BEST MODE

Figure 4:
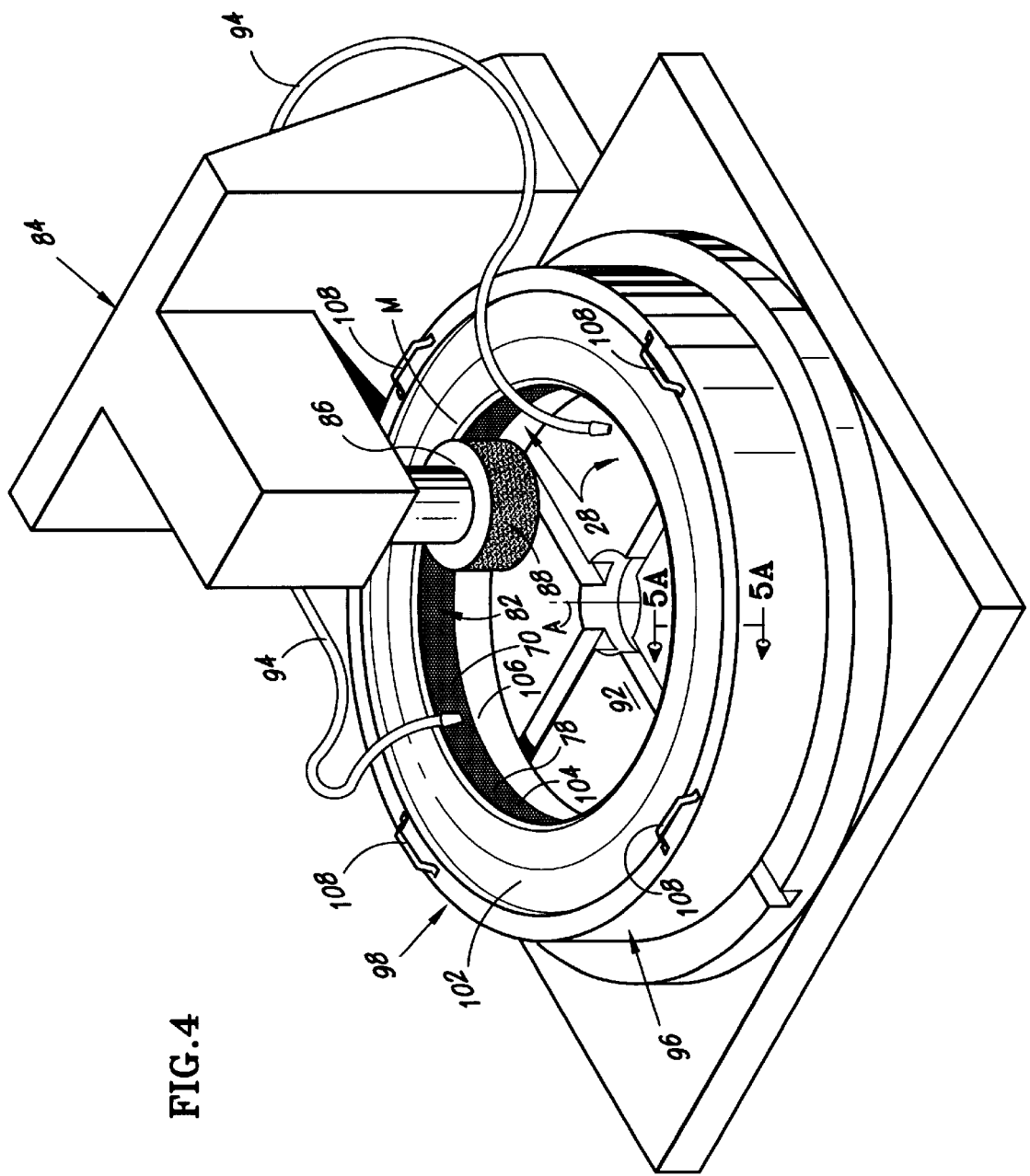
FIG. 4 is a simplified view from above of a grinding machine and the stator assembly shown in FIG. 3 which is disposed on the grinding machine and masked by a shield assembly as the grinding machine forms the finished contour or surface of the seal member.

FIG. 1 is a side elevation view of a rotary machine 10, such as a turbofan gas turbine engine having an axis of rotation $A_r$. The engine includes a compression section 12, a combustion section 14, and a turbine section 16. An annular, primary flowpath 18 for working medium gases extends axially through the sections of the engine. A by-pass flowpath 20 is outward of the primary flow path. The engine is partially broken away to show part of a stator 22 and a rotor 24 in the turbine section. The stator and rotor each include part of a modular unit 26 of the engine. The modular unit of the engine is disposed about an axis A which is at, or in close proximity to, the axis of rotation $A_r$ of the engine.

FIG. 2 is an enlarged side elevation view of the turbine section 16 of FIG. 1 showing a partial cross-sectional view of the modular unit 26. The stator 22 in the modular unit includes a stator assembly 28. The rotor includes two rotor assemblies 32,38. The first rotor assembly 32 has a rotor disk 34 and a plurality of rotor blades, as represented by the rotor blade 36, which extend radially outwardly across the working medium flow path 18. The second rotor assembly 38 is attached to the first rotor assembly by bolts (not shown) which extend between the rotor assemblies. The second rotor assembly includes a rotor disk 42 and a plurality of rotor blades as represented by the rotor blade 44. The rotor includes a lenticular seal 46 adjacent the working medium flowpath. The lenticular seal extends between the adjacent rotor assemblies and circumferentially about the axis A. The lenticular seal has a plurality of knife edge members 48 which extend radially outwardly.

The stator 22 in the modular unit 26 includes the stator assembly 28 which is commonly referred to as a case and vane assembly. The stator assembly has a first side 52 and a second side 54 over the entire radial length of the stator assembly. The stator assembly is disposed between the adjacent rotor assemblies 32,38. The stator assembly extends circumferentially about the axis A and includes a case 62 for confining the working medium gases to the engine.

The stator assembly 28 includes an array of stator vane clusters, as represented by the cluster 58, which are supported from the case 62. The array of stator vane clusters are disposed circumferentially about the axis A. In the embodiment shown, each vane cluster is bolted with bolts 64 directly to the case. In other embodiments, the stator vane cluster may engage an intermediate member which is in turn attached to the case. Each vane cluster has at least one coolable stator vane 66. The stator vane has at least one opening 68 which places the exterior of the vane in flow communication with the interior of the vane for supplying cooling air to the vane.

The stator assembly further includes a seal member 70. The seal member is disposed in close proximity to the knife edge members 48. The seal member is formed of a plurality of arcuate seal segments, as represented by the arcuate segment 72. Each seal segment is supported by at least one stator vane of an associated cluster. Each segment is spaced by a small circumferential gap G (not shown) from the adjacent segment. The case 56 of the stator assembly moves inwardly and outwardly in response to operative conditions of the engine. The segmented seal member 70 has very little hoop strength and provides decreased resistance to movement of the case as compared to a seal member that is one piece and uninterrupted in the circumferential direction.

Figure 5A:
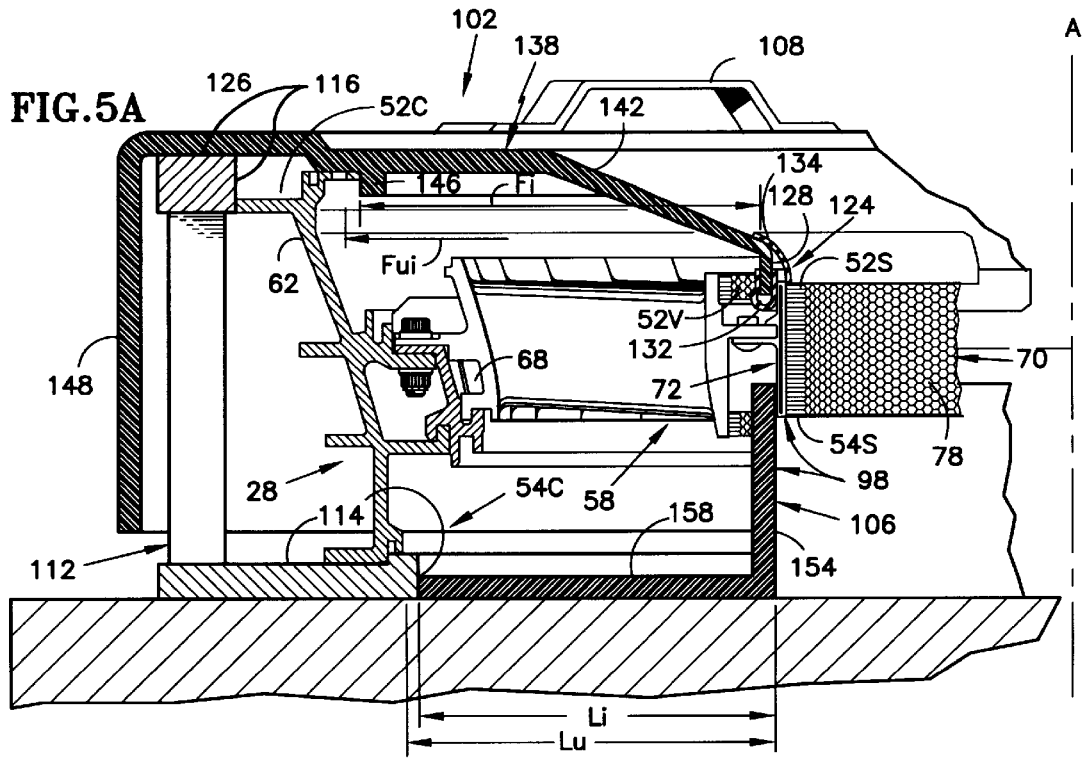
FIG. 5A is a cross-sectional view taken along the line 5A—5A of FIG. 4 showing the relationship of a shield for the stator assembly during the step of machining the finished contour or surface on the seal member.
Figure 5B:
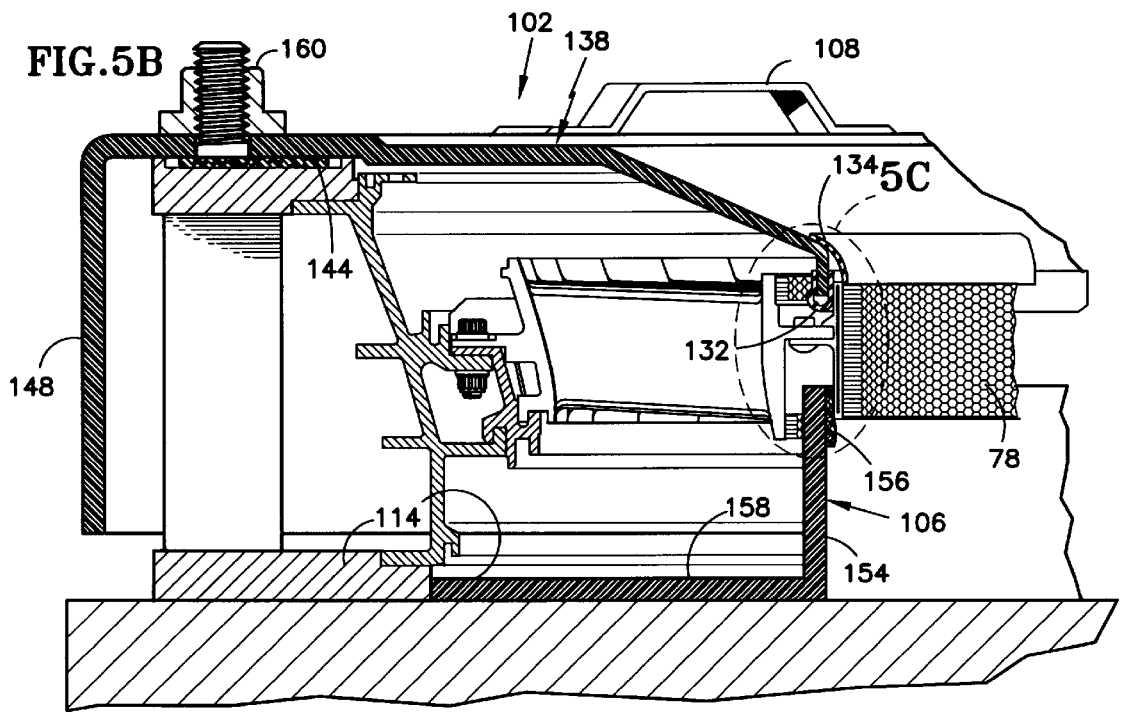
FIG. 5B is an alternate embodiment of the structure shown in FIG. 5A.
Figure 5C:
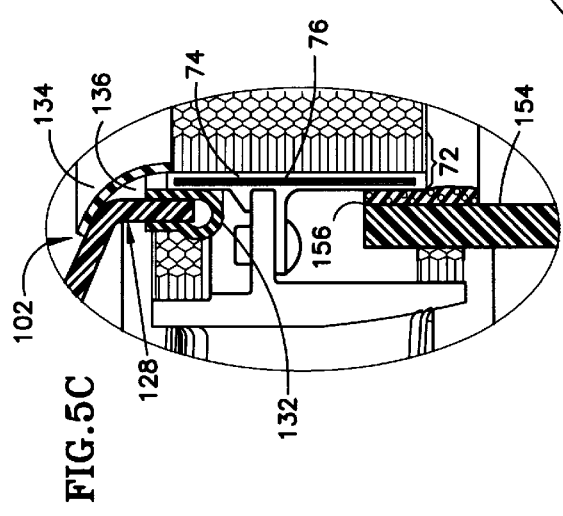
FIG. 5C is an enlarged portion of FIG. 5B.

As shown in FIG. 5C, each seal segment 72 further has feather seal slots, as represented by the feather seal slot 74. Pairs of feather seal slots in adjacent segments face circumferentially for receiving an associated feather seal member, as represented by the feather seal member 76. The feather seal members each extend between a pair of adjacent seal segments in the installed condition. The feather seal members each slidably engage the associated segment to provide sealing in the gap G between adjacent seal segments. The arcuate seal segments and the feather seal members form, in effect, a circumferentially continuous seal member with the feather seal members closing the gap G and sliding on the seal segments as the stator assembly moves inwardly and outwardly in response to operative conditions of the engine.

As shown in FIG. 2, the seal member 70, which extends circumferentially about the axis A, cooperates with the knife edge members 48 to form the lenticular seal 46. The seal blocks the leakage of working medium gases from the flowpath 18 around the inner end of the array of stator vane clusters 58. Accordingly, the seal member has a surface adjacent the knife edges which is carefully ground to a predetermined contour or surface 78 to take into account the location of the knife edges under operative conditions. The contour, depending on the application, may be cylindrical or elliptical. The contour may even be offset from the axis of the engine to account for deflection of the engine under operative conditions.

FIG. 3 is a view of the stator assembly 28 showing the relationship of the case 62 to the seal member 70 during assembly after the step of grinding the surface of the seal member. The stator assembly is ready after cleaning for installation in the modular unit 26 of the turbine section. FIG. 3 also corresponds to a view of the stator assembly taken along the line 3—3 of FIG. 2 with all other portions of the modular unit and the engine broken away. As shown in FIG. 3, the seal segments are so close to each other and so matched that the internal seal surface 78 (the ground seal surface of the seal member) appears as a continuous surface without discontinuity. In this particular embodiment, the surface is formed in a honeycomb like metal structure 82.

The method of forming the stator assembly 28 prior to grinding the seal surface 78 includes building up the stator assembly (the case and vane assembly). This includes assembling a plurality of vane clusters 58 to the stator assembly by bolting the individual vane clusters in place. In one embodiment, the case is circumferentially continuous and receives thirty-three vane clusters. As each vane cluster with its seal segment is inserted in the case, a feather seal member 76 is disposed in the associated feather seal slot 74. A small portion of wax, such as beeswax is, pressed against one or both sides of the feather seal member to hold the feather seal member in place. In alternate embodiments, the gap G may be so small that feather seal members are not required. Alternatively, the processor of the seal member may choose to not install the feather seals. An alternative would be to form a seal between adjacent members by disposing a substitute inter-segment seal for the feather seal in the gap G, such as beeswax. Satisfactory waxes are available from Strahl & Pitsch Inc. as white Beeswax S.P. 422 and Fisher Scientific Co. as W-27 Beeswax (yellow-natural).

As shown in FIG. 4, the stator assembly 28 is disposed in an internal grinding fixture (not shown) in a horizontal position with the axis A extending in a vertical-like direction. The grinding machine may be any grinding machine, such as an internal grinding machine 84, that is capable of accurately grinding the surface 78 of the seal member 70 to form the required contour 78. The machine includes a grinding head 86 having a grinding wheel 88 and has a table 92 for supporting the grinding fixture and stator assembly. The grinding wheel engages the surface of the seal member at the location of machining. Grinding contact between the grinding wheel and seal member generates particles of seal material.

The machine includes a pair of conduits 94 for directing machining fluid at the surface of the seal member. The machining fluid cools and lubricates the grinding wheel and carries away particles of seal material during and after the grinding operation. The machining fluid is typically liquid. The machining fluid may also be gas, such as compressed air. In other embodiments, no fluid is used and particles of seal materials will enter the atmosphere adjacent the location of machining.

The grinding fixture (not shown) is part of an apparatus 96 for use in machining the circumferentially extending seal member. The apparatus includes a shield assembly 98. The shield assembly includes a first (or upper) shield element 102, a second shield element 104, and a third, or lower, shield element 106. The second shield element is formed by the adjacent segments 72 of the seal member 70 and the feather seal members 76 disposed in the feather seal slots 74 between adjacent segments. The first shield element has a pair of handles 108 for ease of installation and removal. The first and third shield elements are formed of a tough thermoplastic material such as ABS resin (acrylonitrile-butadiene-styrene copolymer). The material is relatively rigid such that the first and third elements are self-supporting.

FIG. 5A is a cross sectional view taken along the line 5A—5A of FIG. 4. FIG. 5A shows the relationship of the shield assembly 98 to the stator assembly 28 and to the fixture 112 for supporting the stator assembly. The fixture has a base surface 114 and a rim surface 116 which extend circumferentially about the axis A. The surfaces support the circumferentially extending case 62 of the stator assembly. The rim surface engages the first side 52C of the case. The base surface engages the second side 54C of the case. The fixture orients the case and vane assembly 28 (or stator assembly 28) about the axis A such that the axis extends vertically. The direction is considered vertical if machining fluid would drop away from the seal member 70 and the stator vane clusters 58 because of gravity prior to the fluid entering an opening in the stator vane. This would occur as the liquid flows along surfaces of the stator assembly during machining operations. The surface of the seal member faces horizontally with the axis oriented vertically. The term vertically and horizontally do not imply a strict right angle relationship but an approximation instead, to each other and to the table surface.

The first shield element 102 has a first end 124. A second end 126 is spaced radially from the first end. In the embodiment shown, the second end is spaced radially outwardly of the first end. In an alternate embodiment, the second end might be spaced radially inwardly from the first end. This might occur for a construction which supports the assembly of stator vane clusters from an inner case rather from the circumferentially extending outer case.

The first shield element has a first wall 128 which extends axially to engage one side 52s of the seal member, as represented by the seal segment 72. The first wall forms a cylindrical-like barrier to block the flow of seal particles and is immediately adjacent the first side 52s of the circumferentially extending seal member and to the location of machining M.

The first wall 128 has a first resilient gasket 132 formed of an elastomeric material, such as a buna rubber, that is compatible with the machining fluid and with any solvents used to wipe clean seal particles from the machining apparatus. The resilient gasket has a C-shaped cross section in the uninstalled condition. The gasket engages the first side 52s of the seal segment at an outwardly facing surface. In alternate embodiments, the resilient gasket might engage a circumferentially extending 52v surface on the stator vane cluster or engage both a surface on the vane clusters and a surface on the seal segments. The C-shaped cross section provides a relatively good seal at both locations.

The first shield element has a circumferentially extending skirt 134. The skirt is formed of a flexible material such as a buna rubber. The skirt extends from the first shield element 102 adjacent the first wall 128 and circumferentially about the first side 52s of the seal member. In alternate embodiments, the skirt might extend from the first wall or from another structure. The skirt engages the segments 72 at a location spaced radially from the interface between the first gasket 132 and the seal segments. The skirt blocks the passage of seal particles to the interface. The skirt also blocks machining fluid from impacting directly the sealing region of the first gasket in those operations which employ a machining liquid. This protects the interface from the heavy mass of such fluids.

The skirt 134 construction shown in FIG. 5A is similar to the skirt construction shown in FIG. 5B. FIG. 5C is an enlarged portion of FIG. 5B which is discussed next. As shown in FIG. 5B and FIG. 5C, the skirt 134 cooperates with the first wall 128 and gasket 132 to create a circumferentially extending chamber 136 that traps dry particles in embodiments which use a machining fluid that does not pool, such as air, or embodiments that perform dry machining using a vacuum apparatus to remove particles of seal material.

The first shield element 102 includes a second wall 138 which extends radially from the first wall 128 and axially outwardly of the first side 52c of the case 62. The second wall extends circumferentially about the axis A to engage the rim surface 116 of the fixture and forms a disk-like barrier to block the flow of seal particles. The term "disk-like" means generally the shape of a disk and includes structures having a line of intersection with a plane containing the axis A, such that the line of intersection diverges at an acute angle from the axis A. For example, the second wall has a first portion 142 which diverges from such a plane, and in alternate embodiments might continue diverging until it extends past the case assembly. Such a second wall would adequately protect the stator vane cluster 58 against seal particles entering the stator vane but would have a much greater axial profile than the structure shown in FIG. 5A.

As shown in FIG. 5B, the second wall 138 has a second resilient gasket 144 which extends circumferentially about the shield assembly. The gasket is formed of a PVC foam material (poly-vinyl chloride). The second wall is urged by the threaded member 160 against the rim surface 116 to block the flow of seal particles adjacent the rim surface toward the outer end of the stator vane and the opening for cooling air in the stator vane.

As shown in FIG. 5A, the second wall 138 extends radially beyond the fixture. The second wall has an axially projecting flange 146. The flange engages the outer case 62 to locate the first shield element 102 with respect to the case 62. In the uninstalled condition, the radial distance Fui between the outer surface of the flange 146 and the inner surface of the first wall is greater than the radial distance Fi in the installed condition such that the first wall 128 and its gasket 132 is urged against the circumferentially extending seal member 70 in the installed condition.

The first shield element 102 includes a third wall 148 which is spaced radially from the first wall. The third wall extends axially toward the second side of the case 54c and is spaced radially from the case. The third wall extends circumferentially about the axis A to form a cylindrical-like barrier to block the flow of seal particles. The term "cylindrical-like" means that the barrier forms a surface of revolution which is either parallel to or inclined at an acute angle with respect to the axis A. The term includes configurations which are not parallel to the axis A. In some applications, it may be desirable to use a shield assembly and have shield elements which extend for a circumferential portion of the seal member. Accordingly, the term cylindrical-like and disk-like also apply to portions of a cylindrical-like surface of revolution or disk-like surface of revolution or about the axis A.

The shield assembly includes the second shield element 104. The second shield element is formed of the adjacent seal segments 72 of the seal member 70. As shown in this embodiment, the second shield element includes the plurality of feather seal members 76 as shown in FIG. 5C. The second shield element blocks the flow of seal particles with a cylindrical-like barrier which extends axially from the first wall 128 of the first shield element.

The shield assembly includes the third shield element 106 which has a first wall 154 which engages the second side 54s of the seal member 70. The first wall extends axially from the second side of the seal segment. The first wall extends circumferentially about the axis A to form a cylindrical-like barrier to block the flow of particles of seal material during the machining operation. In the alternate embodiment shown in FIG. 5B, the first wall 154 of the third shield element has a third resilient gasket 156. The gasket may be formed of a PVC foam material. The gasket extends circumferentially about the seal member and is urged into engagement with the circumferentially extending seal member.

The third shield element 106 includes a second wall 158 which is spaced axially from the second wall of the first shield element. The second wall extends radially and circumferentially to form a second disk-like barrier to block the flow of particles of seal material during the machining operation. The second wall abuttingly engages the base surface 114 of the fixture and the table 92 of the grinding machine. Alternatively, it might engage the case. The installed length Li of the third shield element is measured between the base surface of the fixture which the second wall engages and the second side 54s of the seal member at the surface which is engaged by the first wall. The uninstalled radial length Lu of the third shield element might be slightly greater than the uninstalled axial length Li. This causes the second wall in the installed condition to exert a resilient force at the interface between the gasket and the circumferentially extending seal member to provide a tighter seal in such installations.

During the step of machining, the shield assembly 98 blocks the passage of particles of seal material into the interior of the stator vane cluster 58. The seal particles may be thrown into the air and free to float or may be carried by a machining fluid which might pool and flow into the stator assembly 28. An advantage of forming the second shield element 104 with an inter-segment seal member is that the seal member blocks small amounts of machining fluid carrying seal particles from flowing between the adjacent seal segments (and any possible contamination of the vanes). Experimental trials with self supporting shield assembly elements such as the first 102 and third elements 106 shown in FIG. 5A and FIG. 5B were performed with the second shield element. No seal particles entered the stator vanes.

The next step is cleaning the seal member 70 and stator assembly 28 to remove seal particles and other debris that results from the machining operation. Such cleaning must occur prior to final build-up of the case and vane assembly 28 into the modular unit 26 of the turbine section 16. A particular advantage of having the shield assembly with or without a seal member, such as the feather seal members 76, installed for forming the second shield element occurs during cleaning. The seal particles may be cleaned from the seal surface after machining and prior to disassembly by flushing the surface with water to carry away seal particles and wiping the surface down gently to remove any remaining seal particles. In the embodiment shown, feather seal members 76 and the skirt 134 of the first wall block the heavy mass of water from carrying seal particles into the stator vane cluster 58 as it flushes the particles away. In some embodiments, an inter-segment seal member, such as a feather seal member, may not be required. A sealing medium, such as beeswax, may be employed. In other embodiments the gap G may be small enough to avoid the need for inter-segment seal members.

Blocking seal particles from entering any of the vane clusters 58 avoids the need for performing the step of disassembling any of the stator vane clusters for individual cleaning and then reassembling the vane clusters to the case.

This avoids handling damage to vane clusters during disassembly and reassembly and during any cleaning process while the vane clusters are disassembled.

In addition to handling damage, disassembling the stator vanes 58 from the case 56 for cleaning may disturb the as-ground contour (the surface 78). This occurs on occasion due to matched adjacent vane clusters being misaligned on reassembly because of tolerance variations at the initial build-up. In addition, reassembly may cause mismatching of segments (and their seal contours) because adjacent segments are no longer assembled adjacent to each other but are inadvertently mismatched such that they face other vane clusters from the original set of vane clusters. Avoiding disassembly for cleaning results in a better final product.

Disassembling the shield assembly 98 is performed quickly and easily. The FIG. 5A embodiment is moved out or place by sliding the first wall 128 of the first shield element from the surface on the seal member which it engages and which aids in locating the first shield element. The FIG. 5B embodiment requires removal of the securing fasteners which aid in locating the first shield element. The third seal element 106 is similarly snapped out of engagement. The inter-segment seal members of the second shield element are removed or, if formed by feather seal members 76, become part of the final configuration of the stator assembly 28.

After disassembling the shield assembly 98, the next step is inspecting the stator assembly 28 for shield particles. Even if seal material particles are not completely blocked from entering some of the vane clusters 58, experience has shown that the shield assembly will reduce the number of vane clusters contaminated by seal particles. This might occur when a flexible shield assembly such as light polyethylene sheets which are not self supporting, are attached by an adhesive to the sides 52s, 54s, of the circumferentially extending seal member 70. The polyethylene sheet might extend around the case to form a shield assembly for the stator assembly during the machining operation. Two experimental trials for demonstrating the feasibility of shielding the vane clusters were performed using local shields at each of the adjacent vane clusters 58 by masking individual vanes and sealing individual openings of the vane clusters. The process of masking the vane clusters 58, removing the masking material and removing the adhesive required many hours of labor. There is a lesser savings in turn time as compared to using the self-supporting and reuseable shield assemblies shown in FIG. 5A and FIG. 5B. This is because the amount of time needed to install and remove the polyethylene shield assembly partially offsets the savings in turn time from not having to assemble and disassemble the vane clusters for individual cleaning. Accordingly, a particular advantage of the shield assembly shown in FIG. 5A and FIG. 5B is the amount of installation and removal time to install the shield assembly to the stator assembly as compared to other shield assemblies.

In alternate embodiments, the shield assembly might consist of only the first shield element 102, the first and third elements 102,106 or the first and second shield elements 102, 104.

As noted above, an advantage of forming the second shield element 104 with feather seal members 76 is that the seal members block small amounts of machining fluid and cleaning fluid from moving between the adjacent seal segments and possibly contaminating the vane clusters. Another advantage of using the feather seal members for the second shield element is that the seal members are installed in their final configuration. This results in a stator assembly 28 that may be installed directly into the modular unit 26 of the turbine 16 section after cleaning and after adding any parts that need assembly prior to the final build-up.

Still another advantage of installing the feather seal members 76 to create the second shield element 104 or to create a back-up seal between adjacent seal segments prior to machining, is that the feather seal members 76, when installed, act as an alignment device. Installing feather seal members automatically causes assembly personnel to verify that adjacent feather seal slots 74 are correctly oriented with respect to each other and particularly that adjacent vane clusters are located correctly in the radial direction one to the other. This ensures the step of installing the feather seal members 76 will not deform the feather seal members. In the past, misalignment of the slots might cause deformation of the seal members to avoid disturbing the as ground contour 78 of the seal member which was set before installation of the feather seal members. In summary, the seal segments 58 and the resulting seal member 70 are correctly located one to the other because the contour of the seal member is not disturbed by disassembly and assembly for cleaning and because the feather seal members are installed before grinding away the excess seal to form the final contour of the seal member. The foregoing advantages greatly reduce processing time while improving the quality of the final product.

These benefits are still obtained in some measure even if some vane clusters 58 are disassembled to provide internal cleaning by reason of particles of seal material finding their way into the stator vanes. Masking the stator assembly 28 blocked particles from entering the remaining vane clusters during machining. The remaining vane clusters need not be disassembled, as with all vane clusters, for individual cleaning during the subsequent period of time which extends from the step of machining the contour 78 of the seal member to assembling the modular turbine unit which contains the stator assembly. In most cases a substantial number of vane clusters (at least eighty percent) need not be disassembled and in several experimental trials none of the vane clusters required disassembly for cleaning.

The stator assembly is ready for final assembly after performing the machining, and after cleaning and inspecting the stator assembly including the interior of the vane dusters. In the particular embodiment, shown in FIG. 1, the stator assembly is assembled into the modular turbine unit 26 that contains the stator assembly and then into the gas turbine engine 10.

Figure 6:
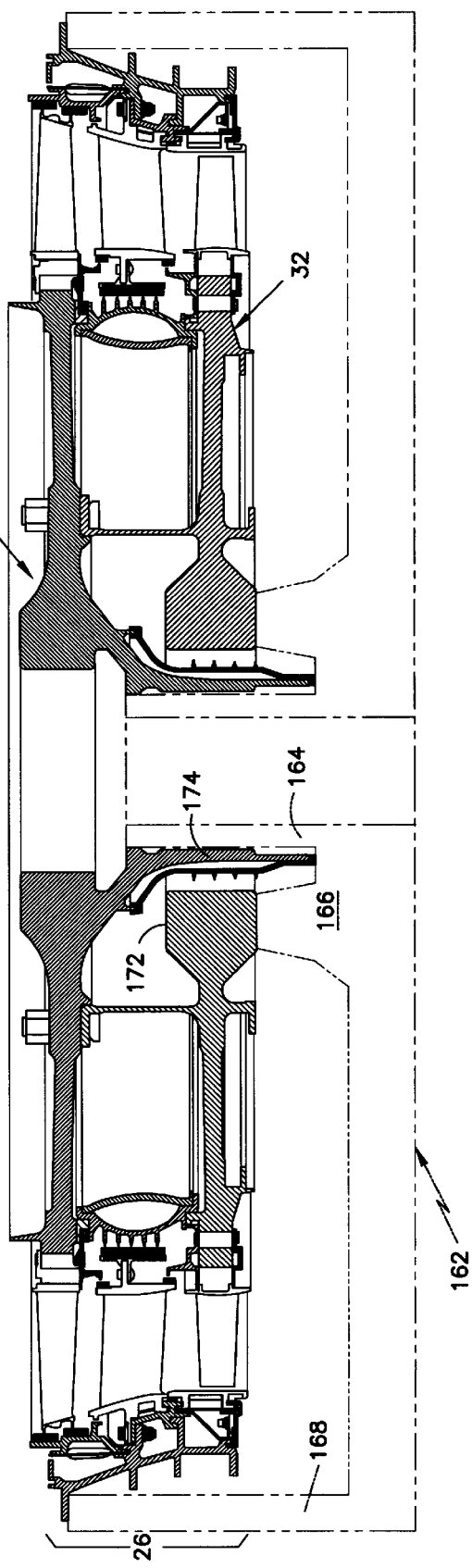
FIG. 6 is a schematic sectional view of a modular unit for the turbine section of the engine disposed in an assembly fixture, the modular unit including a first rotor assembly, a second rotor assembly, and the stator assembly disposed between and circumferentially about the rotor assemblies.

FIG. 6 is a schematic cross sectional view of an assembled modular unit 26 of the turbine section. FIG. 6 illustrates, at the completion of assembly 28, the step of assembling together (commonly called "building-up") the stator assembly 28 and the rotor assemblies 32, 38. The step of assembly follows, after a period of time, the step of machining the circumferentially extending seal member 70 in the first fixture 112. During assembly, the modular unit is disposed in a horizontal second fixture 162 for building up the assemblies The second fixture 162 includes a hub 164 on the interior of the fixture, an inner axial support 168 and a rim or outer axial support 166. The inner axial support engages the hub 172 of the first rotor assembly 32. The rim 168 engages the outer case 62, which is bolted to the rim. The hub 164 of the fixture engages the hub 174 of the second rotor assembly 38. The second rotor assembly is attached to the first rotor assembly and forms a unit with the first rotor assembly.

Figure 7:
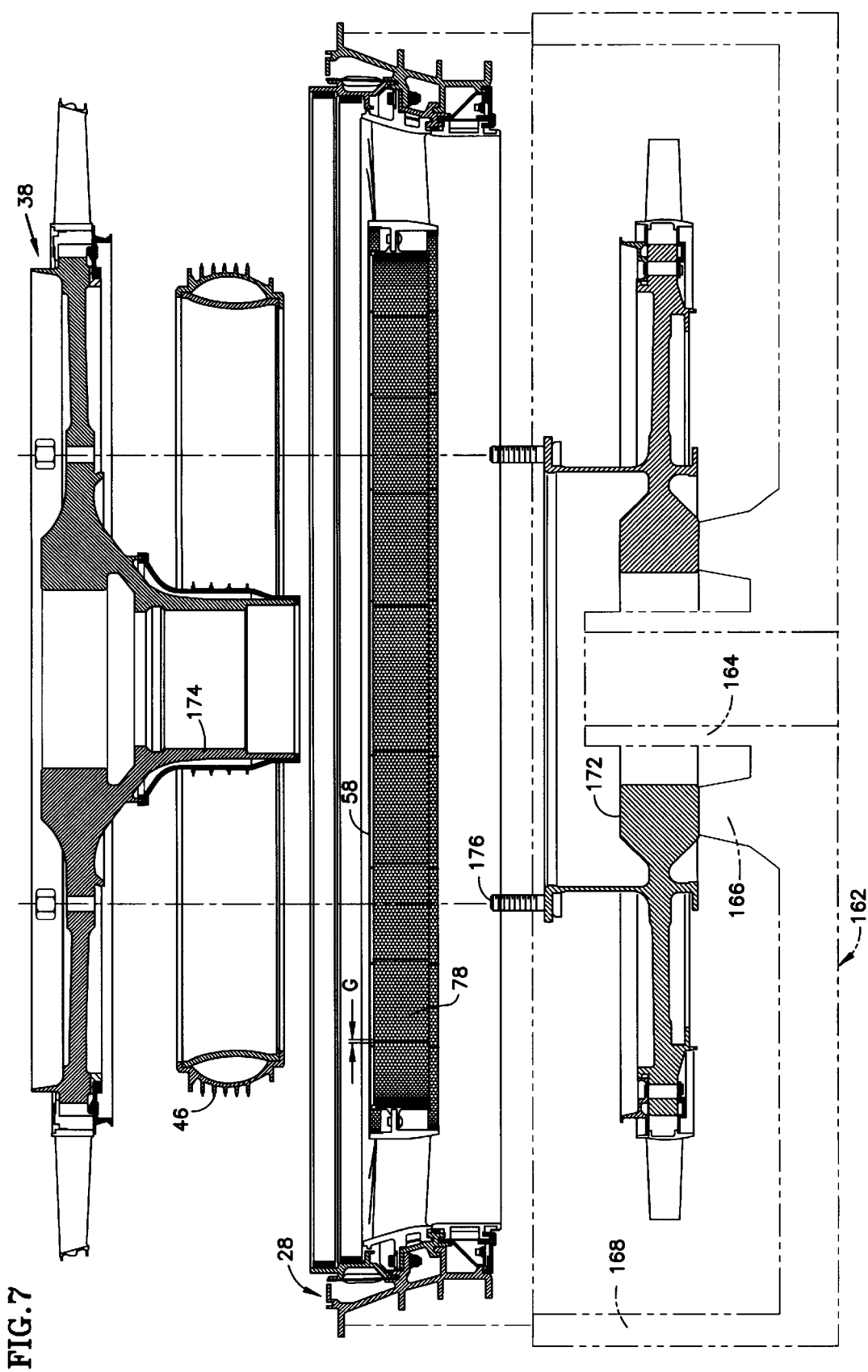
FIG. 7 is a schematic sectional view that shows in exploded fashion the components of FIG. 6 and that illustrates the method of assembling the rotor assemblies and the stator assemblies together in the fixture to form the modular unit for the turbine section.

FIG. 7 is an exploded schematic view of the modular unit shown in FIG. 6. As shown, the first step of building up the stator and rotor assemblies is disposing the first rotor assembly 32 in the horizontal second fixture 162 and engaging the hub 172 of the first rotor assembly 32. The stator assembly 28 is disposed about the rotor assembly and is bolted to the circumferentially extending rim 168 of the fixture. The lenticular seal 46 is assembled to the rotor assembly. The next step is lowering the second rotor assembly 38 into position and engaging the hub 174 of the second rotor assembly with the hub 164 on the interior of the fixture. This fixedly supports the second rotor assembly with respect to the stator assembly. The second rotor assembly is attached by bolts 176 to the first rotor assembly. This fixes the second rotor assembly 38 with respect to the stator assembly by reason of its attachment to the first rotor assembly and through the hub of the fixture to the stator assembly.

Finally, the modular unit 26 of the turbine section 16 is ready for installation into the engine 10 as shown in FIG. 6. The modular unit has an as-ground contour 78 which is undisturbed from the as-ground contour during the machining operation. This precisely locates the seal surface or contour 78 with respect to the rotor 24 in the installed condition and provides a better product than would result if vane clusters 58 were disassembled from the modular unit for any reason after machining the seal member.

Although the invention has been shown and described with respect to detailed embodiments thereof, it should be understood by those skilled in the art that various changes in form and detail may be made without departing from the spirit and scope of the claimed invention.

We claim:

1. A method for forming a modular unit of a rotary machine disposed about an axis A, the modular unit of the rotary machine having a stator assembly which includes a case and vane assembly having a case, coolable stator vane clusters disposed about the interior of the case, and a circumferentially extending seal member supported by the stator vane clusters, the seal member having an as ground finished contour after machining, comprising the steps of:
   machining the seal member to its finished contour by removing particles of material from the seal element;
   masking the case and vane assembly to block particles from entering the vanes during machining; and, after machining the seal member;
   cleaning the stator assembly without disassembling every vane cluster from the case; and,
   assembling the modular unit of the rotary machine that contains the stator assembly;
wherein not disassembling a stator vane cluster for cleaning the stator vane cluster avoids disrupting the as ground contour of the seal member associated with that stator vane cluster and avoids the need to reassemble the stator vane cluster to the case prior to finally assembling the modular unit of the machine.

2. The method for forming a modular unit of a rotary machine of claim 1 wherein the stator assembly has a fully assembled condition and wherein the method further includes the step of cleaning the stator assembly while in the fully assembled condition after the step of machining; and wherein the step of assembling the modular unit includes assembling the stator assembly into the modular unit without disassembling a substantial number of the vane clusters from the case for further cleaning.

3. The method for forming a modular unit of a rotary machine of claim 1 wherein the method further includes inspecting the interior of each stator vane cluster for particles of seal material after the step of machining the seal element.

4. The method for forming a modular unit of a rotary machine of claim 1 wherein the method further includes inspecting the interior of each stator vane cluster for particles of seal material and, in the absence of particles on the interior of all stator vane clusters, assembling the case and vane assembly into the modular unit without disassembling any vane clusters from the case and vane assembly.

5. The method for forming a modular unit of a rotary machine of claim 1 wherein the seal member has a plurality of seal segments which are spaced circumferentially leaving a gap G therebetween and the method includes disposing a feather seal member in an associated gap between at least one pair of adjacent seal segments prior to machining.

6. The method for forming a modular unit of a rotary machine of claim 1 wherein the stator assembly has a first side and a second side which face axially in the installed condition and wherein the step of machining the seal member includes flowing machining fluid adjacent the seal member which carries away seal particles and the step of masking the case and vane assembly includes disposing a shield element between the fluid and the open end of the coolable stator vane cluster and on at least one side of the stator assembly to block the machining fluid from entering the open end of the vane cluster from that side.

7. The method for forming a modular unit of a rotary machine of claim 6 wherein the shield element is a first shield element and wherein the step of machining the the seal member includes disposing a second shield element on the second side of the vane cluster which extends from the second side of the seal element, and which extends between the outer end of the vane clusters and the fluid.

8. The method for forming a modular unit of a rotary machine of claim 7 wherein the step of disposing the shield element includes providing at least one self-supporting shield element.

9. The method for forming a modular unit of a rotary machine of claim 7 wherein the step of disposing the shield element includes providing at least one shield element that is formed of a flexible material.

10. The method for forming a modular unit of a rotary machine of claim 1 wherein the modular unit further includes a first rotor assembly, a second rotor assembly which is attached to the first rotor assembly and the stator assembly has a first side and a second side which is disposed between the rotor assemblies, and which is assembled to the rotor assemblies to form the modular unit and wherein the step of assembling the modular unit includes disposing the rotor assemblies on either side of the stator assembly and attaching the rotor assemblies one to the other.

11. The method for forming a modular unit of a rotary machine of claim 4 wherein the modular unit further includes a first rotor assembly, a second rotor assembly which is attached to the first rotor assembly and the stator assembly has a first side and a second side which is disposed between the rotor assemblies, and which is assembled to the rotor assemblies to form the modular unit and wherein the step of assembling the modular unit includes disposing the rotor assemblies on either side of the stator assembly and attaching the rotor assemblies one to the other.

12. The method for forming a modular unit of a rotary machine of claim 6 wherein the modular unit further includes a first rotor assembly, a second rotor assembly which is attached to the first rotor assembly and the stator assembly has a first side and a second side which is disposed between the rotor assemblies, and which is assembled to the rotor assemblies to form the modular unit and wherein the step of assembling the modular unit includes disposing the rotor assemblies on either side of the stator assembly and attaching the rotor assemblies one to the other.

13. The method for forming a modular unit of a rotary machine of claim 6 wherein the fluid is a machining fluid which is flowed during the step of machining the seal segment.

14. The method for forming a modular unit of a rotary machine of claim 13 wherein the fluid is a liquid.

15. The method for forming a modular unit of a rotary machine of claim 14 wherein the fluid is a gas.

16. The method for forming a modular unit of a rotary machine of claim 6 wherein the step of cleaning includes contacting the seal segment with a fluid.

17. The method for forming a modular unit of a rotary machine of claim 16 wherein the fluid is a liquid.

18. The method for forming a modular unit of a rotary machine of claim 16 wherein the fluid is a gas.

19. A method for forming a modular unit for a gas turbine engine, the modular unit including a first rotor assembly, a second rotor assembly which is attached to the first rotor assembly and a stator assembly having a first side and a second side which is disposed between the rotor assemblies, which extends circumferentially about an axis A in the installed condition and which is assembled in a fixture to the rotor assemblies to form the modular unit, the stator assembly further including a stator case and vane assembly which includes a case which extends circumferentially about the axis A, further including a plurality of vane clusters supported from the case, each vane cluster having at least one coolable stator vane having at least one opening which places the interior of the vane in flow communication with the exterior of the vane, and further including a seal member which extends circumferentially about the axis A and which has a plurality of seal segments, each seal segment being supported by at least one stator vane and each seal segment having a feather seal slots which face circumferentially for receiving associated feather seal members which each extend between a pair of the adjacent seal segments, comprising:

disposing the stator case and vane assembly in a horizontal position such that the axis A is oriented in a substantially vertical direction, the first side faces upwardly, the second side faces downwardly, and the seal member surface faces radially in the horizontal direction;

machining the horizontally facing surface of the seal member to remove material from the seal member to form the contour of the seal element;

flowing fluid adjacent the seal element, the fluid carrying seal particles resulting from the machining process;

blocking the movement of particles into the interior of the vane including disposing a shield between the source of fluid and the interior of the stator vane which further includes, disposing a first self-supporting shield element which extends between the upper side of the seal member to the case for blocking particles from the interior of the stator vane, disposing a second self-supporting shield element which extends between the lower side of the seal member to the case for blocking particles from the interior of the stator vane, disposing feather seal elements in each of the feather seal slots, each extending circumferentially between the associated pair of seal segments and axially between first and second shield elements; thereafter, without disassembly of any vane clusters from the case during the subsequent build period, cleaning the stator assembly after machining to further remove seal particles, and assembling the modular unit that contains the stator assembly including disposing the rotor assemblies on either side of the stator assembly and attaching the rotor assemblies one to the other;

wherein the first and second shield elements cooperate with the seal segments and feather seal elements to block the flow of fluid into the interior of the stator vanes, wherein not disassembling the stator vane clusters for cleaning stator vanes avoids disrupting the as ground contour of the seal segments and avoids the need to reassemble the stator vane cluster to the case prior to the final build of the modular unit.

* * * * *